Nov. 13, 1928.

H. E. PRUITT 1,691,825

NUT TAPPING MACHINE

Filed Dec. 24, 1926

Harvey E. Pruitt

BY

Geo. P. Kimmel ATTORNEY.

Nov. 13, 1928.

H. E. PRUITT 1,691,825

NUT TAPPING MACHINE

Filed Dec. 24, 1926

Harvey E. Pruitt  INVENTOR.

BY

Geo. P. Kimmel  ATTORNEY.

Patented Nov. 13, 1928.

1,691,825

UNITED STATES PATENT OFFICE.

HARVEY E. PRUITT, OF FENTON, MICHIGAN.

NUT-TAPPING MACHINE.

Application filed December 24, 1926. Serial No. 156,848.

This invention relates to a nut tapping machine, and has for its object to provide in a manner as hereinafter set forth, a machine of such class for expeditiously tapping nuts and for the automatic discharge of the tapped nuts during the tapping operation.

Further objects of the invention are to provide, in a manner as hereinafter set forth, a nut tapping machine which is comparatively simple in its construction and arrangement, strong, durable, compact, thoroughly efficient and convenient in its use, readily assembled and comparatively inexpensive to manufacture.

With the foregoing and other objects in view the invention consists in the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
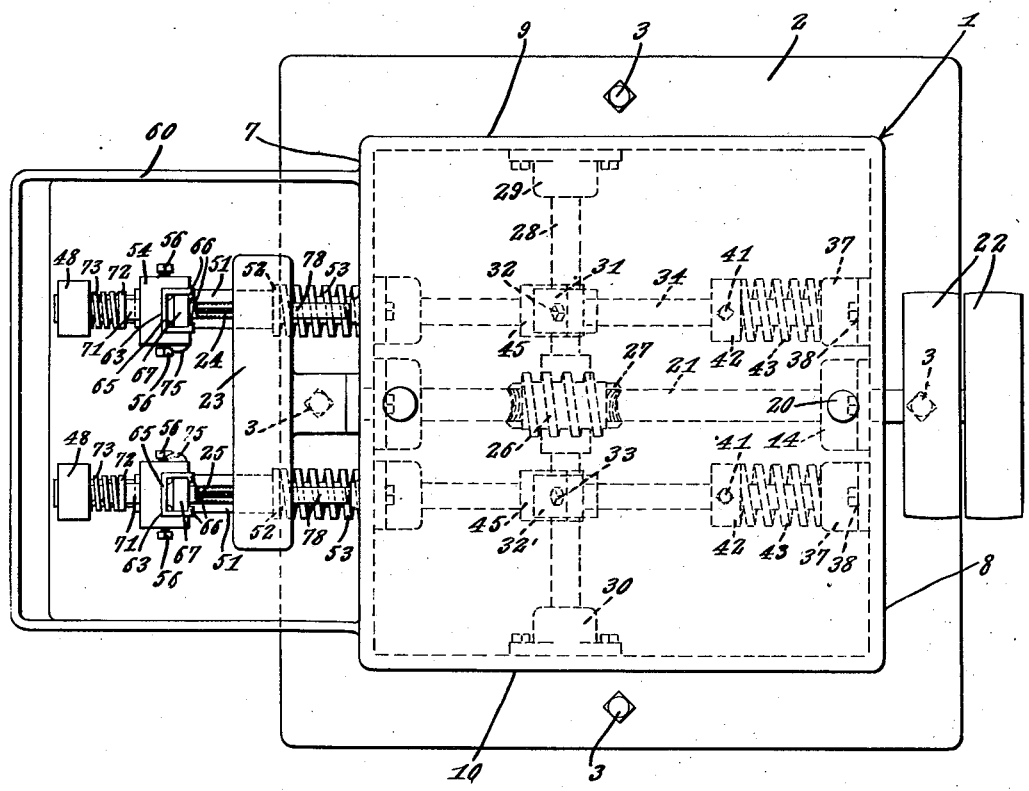
Figure 1 is a top plan view of a nut tapping machine in accordance with this invention.
Figure 2:
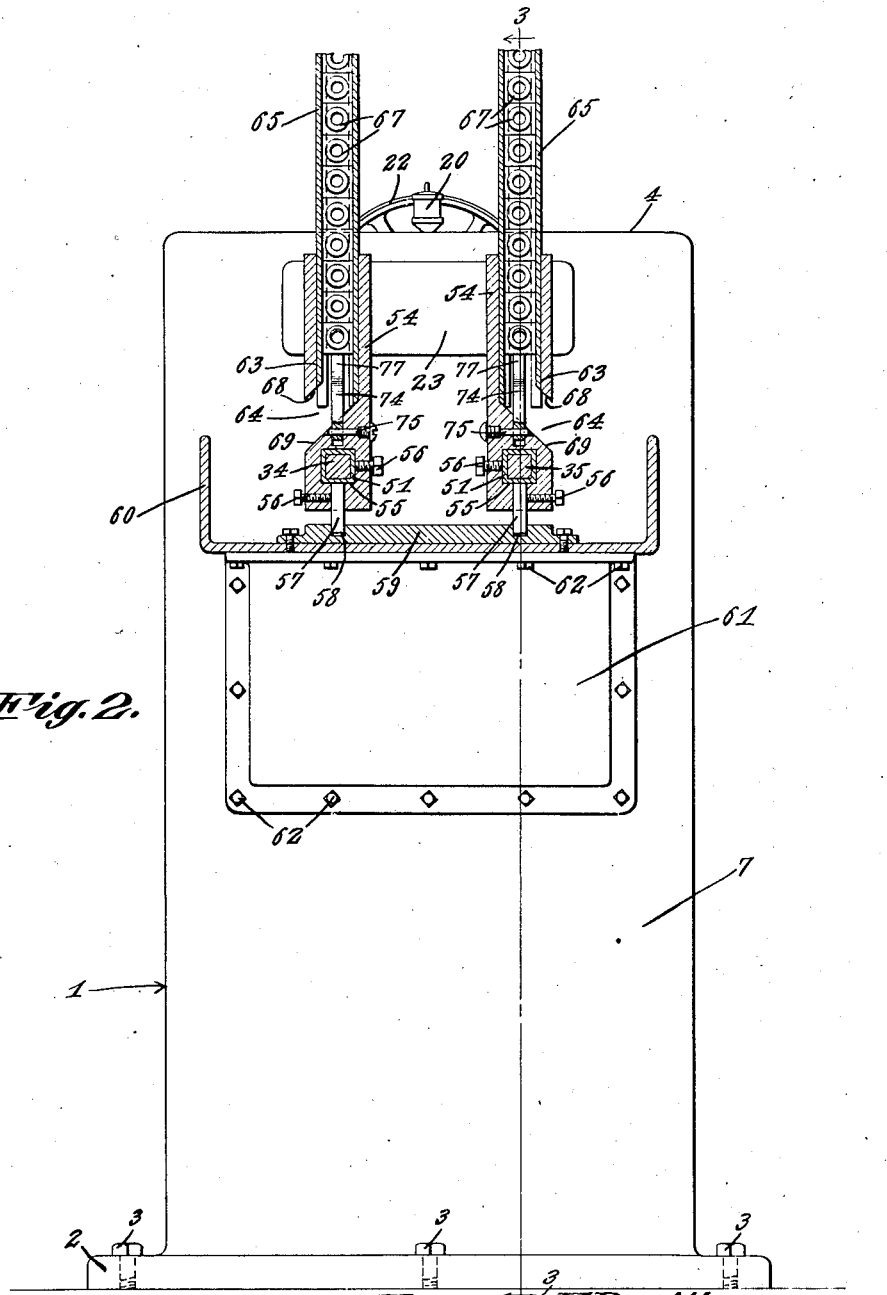
Figure 2 is a section on line 2—2 Figure 3.

Referring to the drawings in detail 1 denotes a vertically disposed support, which is in the form of a housing, and provided with a base flange 2, fixedly secured by holdfast devices 3. The housing 1 is closed at its top and is rectangular in plan. The top of the housing 1, is indicated at 4 and at the transverse median thereof, is provided with a pair of openings 5, 6, the former positioned in close proximity to the side wall 7 and the latter in close proximity to the side wall 8 of the housing. The rear wall of the housing is indicated at 9 and the front wall at 10. The side wall 7 near its upper end is provided with an opening 11, positioned in alinement with an opening 12 formed in the side wall 8. The openings 11 and 12 are positioned in parallelism with the transverse median of the top 4. Secured to the inner face of the side wall 7 at the top thereof, is a flanged collar 13 which alines with a flanged collar 14 secured to the inner face of the side wall 8 near the top thereof. The flanges of each of said collars are indicated at 15 and extending therethrough are holdfast devices 16 which fixedly secure the collars to the side walls 7 and 8. Arranged within each of said collars is a bearing sleeve 17 having its inner face flush with the wall of an opening 11 or 12. Each collar, centrally of its top is provided with a port 18 which registers with an opening 19 formed in a bearing sleeve 17. Extending through the opening 5, as well as the opening 6, is a lubricant supply device 20 and which projects in and is secured in a port 18, and said devices provide means for lubricating the operating shaft 21 of the machine.

The shaft 21 extends transversely of the housing 1, through the bearing sleeves 17 and projects from the side walls 7 and 8. That end of the shaft 21 which projects from the side wall 8 is provided with a driving means therefor, indicated at 22 and which is adapted to be connected to a prime mover.

That end of the shaft 21 which projects from the side wall 7 extends into a tool carrier 23 of any suitable construction and which is secured stationary to the wall 7. As shown the holdfast devices 16, which secure the collar 13 to the side wall 7 are employed for securing the tool carrier 23 in a stationary position. The tool carrier has extended therefrom a pair of taps 24, 25 and which are arranged in spaced relation and the carrier 23 is provided with any suitable means, operated from the shaft 21 for the purpose of revolving the taps. As before stated the carrier 23 can be of any known construction and the taps 24, 25 driven from the shaft 21 by any suitable means. The shaft 21, intermediate its ends is provided with a worm 26 and which is arranged within the housing 1. The worm 26 is employed for operating a spring controlled work feed for shifting the nuts, which are to be tapped, in a direction towards the taps 24, 25, and associated with the worm 26, as well as driven thereby, is a worm gear 27, carried by a shaft 28 extending horizontally of the housing 1, and which is journaled at one end, in a bearing 29 secured to the rear wall 9 and at its other end in a bearing 30 secured to the front wall 10. The shaft 28 between the worm gear 27 and one end thereof, carries a shifting arm 31, which is secured intermediate its ends, by the set screw 32 to the shaft 28, and the latter is provided between the worm gear 27 and the other end thereof with a shifting arm 32', secured intermediate its ends by a set screw 33 to the shaft.

The machine further includes a combined intermittently operated nut support and feed comprising a pair of spaced, slidable, spring controlled supporting rods 34, 35 and each of which is slidably mounted in a pair of opposed flanged collars 36, 37 secured respectively by the holdfast devices 38 to the inner faces of the side walls 7, 8. The collar 36 registers with an opening 39 formed in the side wall 7 and the collar 37 registers with an opening 40 formed in the side wall 8. Each rod is of polygonal cross section. The rods project a substantial distance from the side walls 7 of the housing 1.

Each supporting rod at a point in proximity to the collar 37 has secured thereto by the set screw 41 an adjustable stop collar 42, and mounted on the rod and interposed between the collars 37 and 42, is a coil controlling spring 43 which tends to normally project the rod from the side wall 8. The rod at a point between the collars 36 and 42 has secured therewith by the set screw 44, a sleeve 45, having an offset 46, which is intermittently engaged by an arm 31 or 32' for shifting the rod towards the side wall 8 of the housing 1 against the action of the spring 43.

Each of the supporting rods, at that end thereof arranged exteriorly of the side wall 7 of the housing 1 has secured thereto, by the set screw 47, a vertically disposed arm 48, having its lower portion provided with an opening 49 from which extends the supporting rod. The arm 48 at its upper end is provided with a right angularly disposed bar 50 which extends towards the side wall 7 of the housing 1. Mounted on each supporting rod between the arm 48 and the side wall 7 of the housing, is a polygonal shaped sleeve 51 having a flange 52 at one end thereof, and which is arranged adjacent to the opening 39. Surrounding each supporting rod and interposed between the flange 52 and the side wall 7 of the housing 1, is a coil controlling spring 53 for the sleeve 51. Mounted on each sleeve 51, is a vertically disposed carrier 54, having a polygonal shaped opening 55 in its lower end for the passage of the sleeve 51. The opening 55 corresponds in contour to the contour of the sleeve 51 and the latter and carrier 54 are secured together by the set screw 56. The supporting rod is slidably mounted in the sleeve 51. Connected to the lower end of the carrier 54, by the set screw 56, is a depending guide piece 57, which travels in a guide groove 58, formed in the upper face of a plate 59, secured to the bottom of a receptacle 60 which projects laterally from the side wall 7 of the housing 1 and is supported by a brace element 61, secured to the side wall 7, by the holdfast devices 62.

The carrier 54 is interposed between the carrier 23 and the arm 48 and is spaced a substantial distance from the latter. The carrier 54 on that face which opposes the carrier 23, is formed with a vertically extending groove 63, terminating at its lower end in an outwardly extending and downwardly inclined discharge groove 64 and which opens at one side of the carrier, and which is the outer side thereof. Secured in the groove 63 and extending above the carrier 54 is a vertically disposed nut guide 65 of channel-shaped cross section and which has the open side thereof formed with oppositely disposed inwardly extending flanges 66. The nut guide projects from the grooved face of the carrier 54. The nuts are indicated at 67 and feed by gravity to a position to be acted upon by the taps 24, 25. One side of the guide 66 terminates at the upper wall 68 of the groove 64 and the other side of the guide 66 terminates at the lower wall 69 of the groove 64.

Each guide 66 is provided with an opening 70, which alines with a tapper, and extending from the guide 65, as well as registering with the opening 70 and projecting through the carrier 54, in a direction towards the arm 48, is a tubular member 71, having its outer end flanged as at 72. Mounted on the bar 50 and interposed between the flange 72 and the arm 48, is a coil controlling spring 73 to assist in restoring the arm 48 to normal position.

Figure 3:
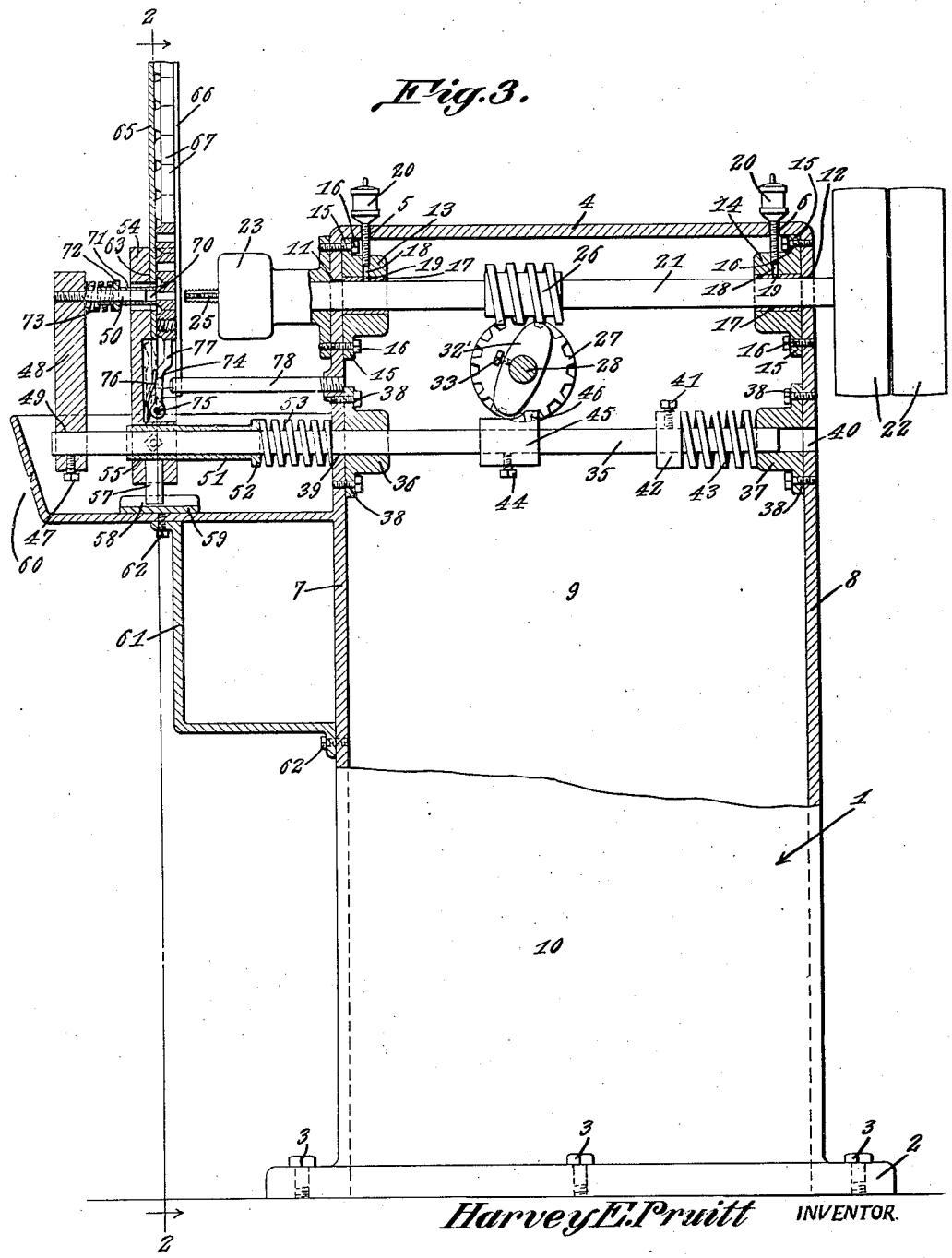
Figure 3 is a section on line 3—3 Figure 2.

Arranged within the lower portion of each carrier 54, is a combined nut positioning, holding and releasing member 74, which is pivotally connected at its lower end as at 75, and has associated therewith a controlling spring 76 which is positioned within the carrier 54. The upper portion of the member 74 is offset, as indicated at 77 and which acts as a means to support the lower one of the nuts 67, such lower nut having been tapped. The member 74 is shifted from holding position with respect to the tapped nut, so that the latter can fall into the receptacle 60, by a shifting bar 78, which projects from the wall 7, of housing 1 and is positioned in the path of the carrier 54, and by this arrangement when the carrier 54 moves towards the wall 7, the bar 78 will shift the member 74 to the dotted line position shown in Figure 3 and the tapped nut will be released, but the nut above the tapped nut will be held by the tap and by the time the nut held by the tap is released therefrom, the member 74 will be positioned in the full line showing, Figure 3 so as to hold the tapped nut until the carrier 54 has been shifted forwardly during the tapping operation.

The flanges 66 prevent the nuts from falling out or being pulled out the groove 63 until a tapped nut has reached the discharge groove 64. The construction provides for simultaneously tapping and discharging two tapped nuts. The rods 34, 35 move the arms 48 towards the carriers 54 against the action of the cushioning spring 73 and when the arms 48 move forwardly, they provide for the shifting of the carriers 54 towards the tappers. The bars 50, in connection with the tubular members 71 act as guides for the arms 48 with respect to the carriers 54. When the carriers 54 move forwardly, such action is had against their controlling springs 53, whereby when the nuts are released from the taps, said carriers 54 will be shifted rearwardly on the rods 34, 35. When the carriers 54 move forwardly the rods or members 78 will shift the members 74 to non-holding position with respect to the tapped nuts so that these latter can be discharged into the receptacle 60. When the shifting arms 31 and 32' move clear of the offset 46, on the sleeves 45, the springs 43 will shift the rods 34, 35 rearwardly carrying the arms 48 therewith, and when the nuts are released from the tappers the springs 53 will shift the sleeves 51 rearwardly on the rods 34, 35 carrying the carriers 54 therewith and the movement of these latter will be guided by the depending guides 57 traveling in the grooves 58.

It is thought that the many advantages of a nut tapping machine, in accordance with this invention, can be readily understood, and although the preferred embodiment of the invention is as illustrated and described, yet it is to be understood that changes in the details of construction can be had which will fall within the scope of the invention as claimed.

What I claim is:

1. A nut tapping machine comprising a pair of spring controlled shiftable nut carriers, each carrier being provided with a vertically disposed nut guide terminating at its lower end in an outwardly extending downwardly inclined discharge groove for the nut, an intermittently operable spring controlled work feed for shifting the carriers against the action of their controlling springs in a direction to position a pair of nuts to be tapped, said carriers being slidably supported on said work feed, and shiftable nut holding means mounted in the lower ends of the carriers for normally holding the tapped nuts within the carriers and adapted when shifted from normal position to permit of discharge of the tapped nuts.

2. A nut tapping machine comprising a pair of spring controlled shiftable nut carriers, each carrier being provided with a vertically disposed nut guide terminating at its lower end in an outwardly extending downwardly inclined discharge groove for the nut, an intermittently operable spring controlled work feed for shifting the carriers against the action of their controlling springs in a direction to position a pair of nuts to be tapped, said carriers being slidably supported on said work feed, shiftable nut holding means mounted in the lower ends of the carriers for normally holding the tapped nuts within the carriers and adapted when shifted from normal position to permit of discharge of the tapped nuts, tap means, and a common operating means for said work feed and tap means.

3. A nut tapping machine comprising a pair of spring controlled shiftable nut carriers, each carrier being provided with a vertically disposed nut guide terminating at its lower end in an outwardly extending downwardly inclined discharge groove for the nut, an intermittently operable spring controlled work feed for shifting the carriers against the action of their controlling springs in a direction to position a pair of nuts to be tapped, said carriers being slidably supported on said work feed, shiftable nut holding means mounted in the lower ends of the carriers for normally holding the tapped nuts within the carriers and adapted when shifted from normal position to permit of discharge of the tapped nuts, and means extending into the nut carriers for shifting said nut holding means from normal position.

4. A nut tapping machine comprising a pair of spring controlled shiftable nut carriers, each carrier being provided with a vertically disposed nut guide terminating at its lower end in an outwardly extending downwardly inclined discharge groove for the nut, an intermittently operable spring controlled work feed for shifting the carriers against the action of their controlling springs in a direction to position a pair of nuts to be tapped, said carriers being slidably supported on said work feed, shiftable nut holding means mounted in the lower ends of the carriers for normally holding the tapped nuts within the carriers and adapted when shifted from normal position to permit of discharge of the tapped nuts, supporting means for said work feed, means carried by said supporting means and adapted to extend into the carriers for forcing said holding means from normal position, and a receptacle carried by said supporting means and adapted to receive the tapped nuts.

5. A nut tapping machine comprising a pair of spring controlled slidably mounted nut carriers, each carrier being provided with a vertically disposed nut guide terminating at its lower end in an outwardly extending downwardly inclined discharge groove for the tapped nuts, an intermittently operable spring controlled work feed including means engaging with the carriers for shifting them against the action of their controlling springs in a direction to position a pair of nuts to be tapped, said carriers being slidably supported on said work feed, shiftable means mounted in the lower ends of the carriers for normally holding the nuts within the guides and adapted when shifted from normal position to permit of the discharge of the tapped nuts, and operating means for said work feed.

In testimony whereof, I affix my signature hereto.

HARVEY E. PRUITT.